J. G. PETTIS.
TORCH.
APPLICATION FILED SEPT. 18, 1919.
1,376,828.
Patented May 3, 1921.
2 SHEETS—SHEET 2.
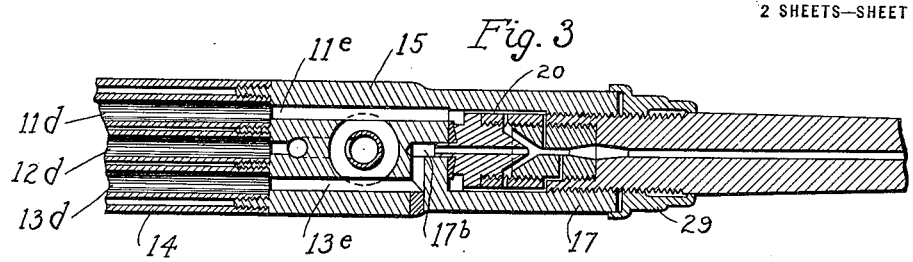
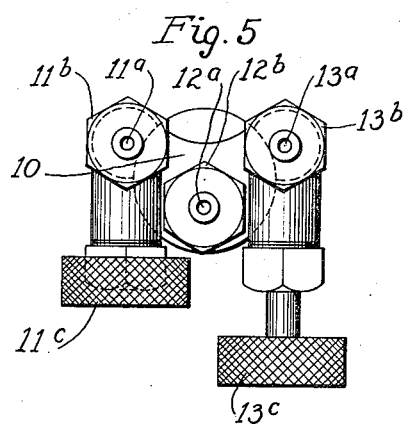
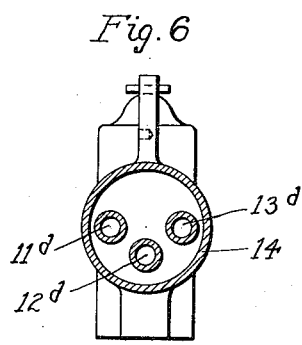
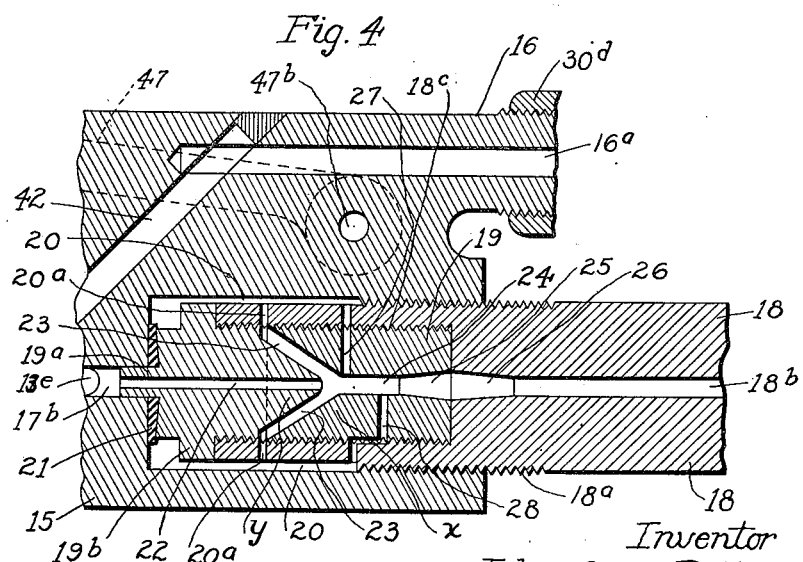
Inventor
John Gray Pettis
By Benjamin, Roodhouse & Lundy
Attys.

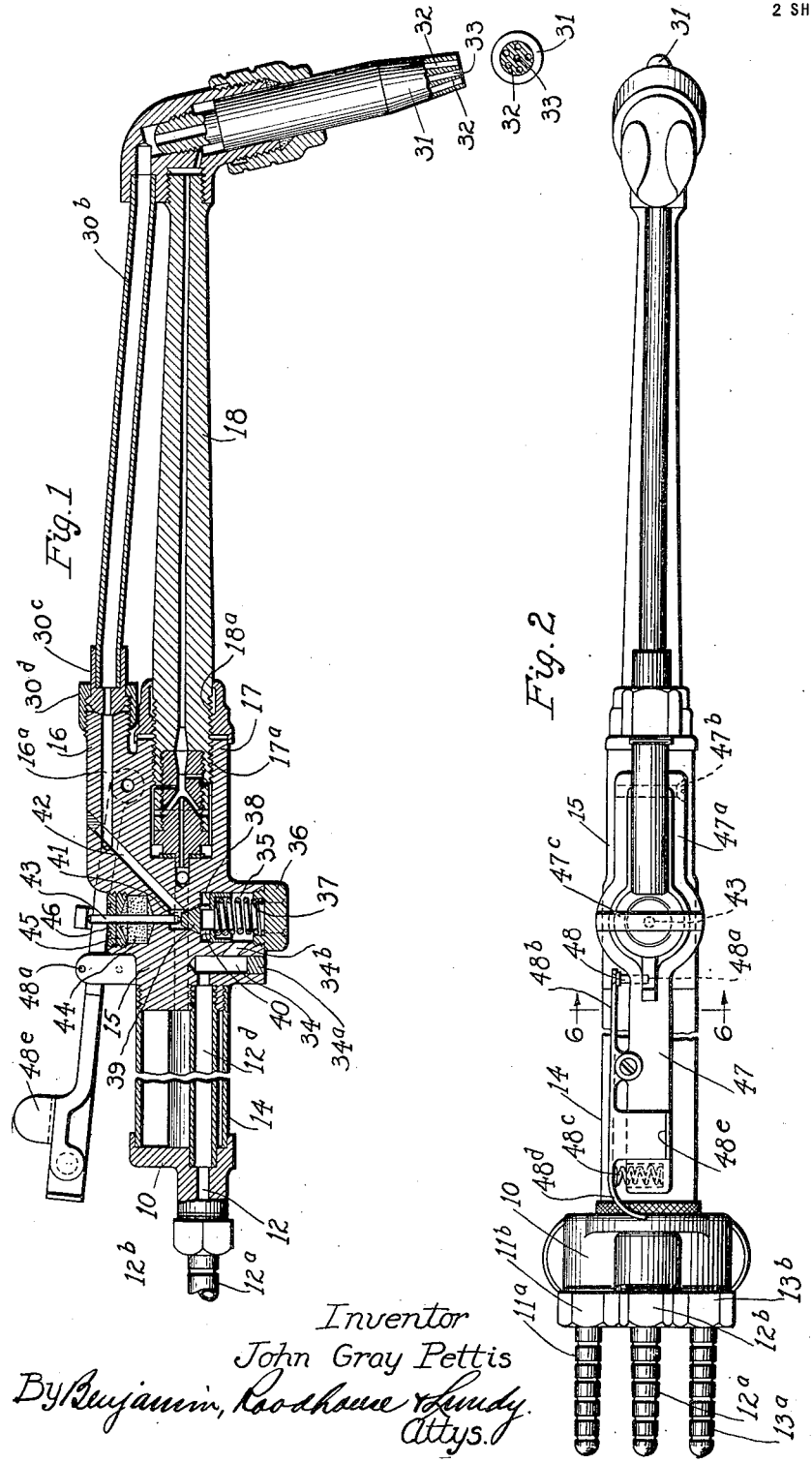

UNITED STATES PATENT OFFICE.

JOHN GRAY PETTIS, OF CHICAGO, ILLINOIS.

TORCH.

1,376,828.     Specification of Letters Patent.     Patented May 3, 1921.

Application filed September 18, 1919. Serial No. 324,271.

*To all whom it may concern:*

Be it known that I, JOHN GRAY PETTIS, a citizen of the United States, residing at Chicago, county of Cook, and State of Illinois, have invented a new and useful Improvement in a Torch, of which the following is a specification.

My present invention has relation to improvements in blow torches or blow pipes which are employed for the production of an intense heat and used in connection with welding or for cutting metal. For welding, an intensely hot flame is desirable and in order to secure an intense flame the gases or elements employed for producing the flame are fed to the tip where the flame normally burns in a suitably balanced mixture to secure complete combustion, and the employment of such a mixture permits "flash back" when the flow of gases is interrupted. In a cutting torch, where the heat and combustion have to be as equally intense as in a welding torch, it is desirable to have the oxidizing agent in a considerable preponderance so that the heated metal will be oxidized and consumed, thereby facilitating the separating or cutting of the metal.

In both these forms of instrument it has also been found desirable, in order to produce the most intense heat, to feed a mixture of the gases or elements (the balanced mixture of which is used to produce the heat) to the flame. The employment of such a combustible balanced mixture renders it possible, when the orifice of the outlet of the instrument becomes clogged, for the flame to flash back or recede into the instrument where the intense heat it produces will burn up or destroy the instrument unless the gases are shut off, which of course involves the interruption of the operation. In the form of instrument used for cutting metal the preponderance of the oxidizing element is usually supplied under considerable pressure which has heretofore caused the chattering of the valve employed for its control.

The objects of my present invention are, first, the provision of means for securing a combustible mixture of gases which upon the occurrence of a flash back will automatically change the ratio or relative proportions of the gases to such an extent that the mixture will no longer be combustible, and will thereby extinguish the flame in the instrument, and, upon the extinguishment of the flame in the instrument, will automatically reëstablish the desired combustible ratio. A second object of my invention is the provision of a control-valve for feeding the excess of the oxidizing element, which is simple of operation and will be free from the chattering which has heretofore been inherent in valves for controlling this element. Other objects of my invention are the production of a relatively simple structure that is economical to manufacture and easy of operation. I prefer to accomplish the foregoing enumerated and other objects of my invention by means of a structure similar to that illustrated in the accompanying drawings, in which—

Figure 1 is a longitudinal central section of a torch constructed in accordance with my invention, and of the cutting type.

Fig. 2 is a top plan of the torch illustrated in Fig. 1, showing the construction and disposition of the valve-controlled lever.

Fig. 3 is a horizontal section showing a fragmentary portion of the structure to illustrate the disposition of the conduits.

Fig. 4 is an enlarged view of the central portion of the structure illustrated in Fig. 1.

Fig. 5 is a rear end view of the torch.

Fig. 6 is a transverse section on line 6—6, Fig. 2.

Similar reference characters have been employed to designate the same parts throughout the several views. The rear end of the instrument comprises a casting 10 bored longitudinally to provide three channels 11, 12 and 13, that communicate with nipples $11^a$, $12^a$ and $13^a$ adapted to receive flexible conduits, suitable packing and packing nuts $11^b$, $12^b$ and $13^b$ are provided for securing the nipples in place and preventing leakage at the points of juncture. Suitable valves $11^c$ and $13^c$ control the passageways for the bores 11 and 13, respectively, which bores are employed for supplying the fuel and oxidizing element to be mixed therewith to the instrument. The handle comprises a tube 14 the rear end of which is secured in an annular collar provided on the front end of casting 10. Mounted within tube 14 are tubular conduits $11^d$, $12^d$ and $13^d$ which communicate with and extend into passageways 11, 12 and 13. Secured to the outer or forward end of the tube of the handle 14 is the cast block 15, the forward end of which block is provided with two extensions or embossments 16 and 17, which are exteriorly threaded. The embossment 16 is bored to provide a channel 16ª, and the embossment 17 is bored and interiorly threaded to provide a channel 17ª. In the center of the bottom of bore 17ª a further reduced bore 17ᵇ is provided the bottom of which communicates through a suitable channel 13ᵉ with the tube 13ᵈ which is tapped into block 15, and thence to channel 13 in casting 10. A rod 18, the base of which is exteriorly threaded at 18ª screws into bore 17ª, rod 18 being provided with a central bore 18ᵇ the lower end whereof is enlarged and interiorly threaded, at 18ᶜ, to receive the plug 19 the outer end of which is provided with a stub 19ª which extends into the central reduced bore 17ᵇ of block 15. The base of rod 18 is reduced to provide an annular channel 20 between the same and the walls of the bore 17ª.

I prefer to form the plug 19 in two parts the inner section whereof screws into the bore 18ᶜ until it abuts the inner end thereof, as shown in Fig. 4 of the drawings, while the outer section of the plug 19 is exteriorly threaded and is screwed into bore 18ᶜ until the annular shoulder 19ᵇ on the plug abuts against the adjacent end of rod 18. In order to seal annular channel 20 from bore 17ᵇ, a suitable washer 21 is interposed between the end of the adjacent section of plug 19 and the bottom of the enlarged portion of bore 17ª. The annular channel 20 is in communication through bore 11ᵉ and tube 11ᵈ to channel 11 in casting 10. A reduced bore 22 is provided centrally of plug 19 through the stub 19ª to the channel 17ᵇ. The adjacent ends of the two sections of plug 19 are formed with a conical recess x and a conical projection y and said sections are spaced slightly apart to provide the conical or diverging channel 23 leading from about the middle of the annular chamber 20 through plug 19 to the central bore 22 which at the juncture of this diverging channel 23 is enlarged, at 24, and, preferably, again enlarged, at 25, where it connects with a similar enlargement 26 provided in bore 18ᵇ of rod 18. Small lateral passageways 20ª are bored transversely through a convenient and adjacent portion of the end of rod 18 to establish communication between chamber 20 and the diverging channel 23. From the forward portion of annular chamber 20 are provided, through the walls of rod 18 and plug 19, bores 27 and 28 communicating with bore 24 forward of its juncture with bores 23. The juncture of rod 18 with extension 17 is covered by a ferrule or collar 29 which screws onto rod 18 and the rearwardly extended edge whereof covers the forward end of extension 17. Upon the forward end of rod 19 is screwed a nozzle into which is secured a tip 31. A tip suitable for a cutting torch is provided, preferably, with a series of concentrically arranged channels 32 which discharge from orifices arranged about the center of the tip through which the combustible mixture is discharged, while the center of the tip is provided with a channel 33 supplied, through the mechanism to be hereinafter described, with the oxidizing element.

When acetylene gas is employed as a fuel it is found desirable to employ it at a pressure in proportion to the size tip used at which pressure it is supplied to annular chamber 20. The oxygen element is supplied to recess 17ᵇ at a pressure varying in proportion to the volume of preheating flame necessary to create perfect combustion of the mixture for the thickness of the metal to be cut. When the oxygen element at its relative pressure reaches the conical passageway 23 through passageway 22, both by reason of its velocity of flow and by reason of the expansion permitted by the enlargement of the bore, tends to draw or suck the combustible fuel through the channels 23, 27 and 28 into the central bore, and the combination of the fuel with the oxygen thus secured constitutes a combustible mixture. This mixture feeds forward through the bore 18ᵇ from the tip by reason of the pressures employed and burns at the orifices 32. When, however, orifices 32 are accidentally closed the movement of the combustible mixture of gases through bore 18ᵇ is arrested and a "flash back" occurs which is in the nature of an explosion in bore 18ᵇ and develops considerable back pressure therein from the nozzle or tip. The pressure thus developed generally serves to clear the orifices and also acting progressively through the several channels for the supply of the fuel and the single channel for supplying the oxidizing element the combustible ratio of the fuel and the flame in bore 18ᵇ is at once extinguished. This is owing to the fact that above the high combustible limit of a mixture of acetylene and oxygen and below the low combustible limit thereof, no combustion will take place within a container such as the interior of a pipe. Upon the clearing of orifices 32 a normal flow of gases under normal working pressure is again established in bore 18ᵇ, and a flow and mixture of the elements in a combustible ratio is again established which mixture is generally re-ignited in front of orifices 32 by impinging upon the intensely heated work, thereby reëstablishing the desired condition without the necessity of providing a flame to relight the torch, or the necessity of disturbing the regulating valves,—or the main source of supply, and thereby eliminating all possibility of burning out the mixing chamber in conduits 24, 25 and 26 and parts adjacent thereto. It will be realized that these operations take place very quickly and the "flash back" occurs and is extinguished and the torch relighted before the operator has actually discovered that anything is wrong and before the operations of cutting or welding have been interrupted.

In supplying additional oxygen or other suitable oxidizing element, desirable in cutting operations, the additional oxidizing element is usually employed under a pressure sufficient to oxidize the metal being cut and clear the oxidized metal from the cut. This additional oxidizing element is supplied through the channel 12 and tube 12$^b$ to a vertical bore 34 in the bottom of block 15, and the end of this vertical bore 34 is closed by a plug 34$^a$. Adjacent bore 34 is another vertical bore 35 with which vertical bore 34 has communication through a channel 34$^b$. The rear open end of vertical bore 35 is closed with a plug 36 in a central depression in which seats a coiled spring 37 the upper end whereof seats in a recess in a piston-like piece 38 which fits bore 35. The piston-like piece 38 has an upwardly projecting conical extension 39 which is bored and laterally slotted, at 40, to permit the oxidizing element entering chamber 35 through channel 34$^b$ below the structure 38 to pass above the same without exerting any upward pressure thereon. The chamber 35 has a central reduced upward extension 41 in which the conical extension 39 seats. The reduced extension 41 of chamber 35 communicates by means of the channel 42 with bore 16$^a$, heretofore described. The block 15 is bored immediately above the reduced chamber 41 to receive the valve rod or tappet 43 the lower end of which impinges upon the top of the conical extension 39 of the piston-like structure 38, and the upper end of which extends above block 15 being suitably packed with packing 44, packing gland 45 and packing nut 46. The means for actuating the valve tappet rod, preferably, comprises a bifurcated lever 47 the spaced arms 47$^a$ whereof are fulcrumed at their outer ends upon a screw or pin 47$^b$ passing through a convenient portion of block 15. A bridge-bar 47$^c$ connects arms 47$^a$ above the tappet rod 43 so that the depression of lever 47 will force the conical extension 39 from its seat against the action of spring 37. For the purpose of retaining the lever in a fully depressed position, I have provided latching means consisting of latch-pin 48 that engages with a recess 48$^a$ in a convenient portion of block 15. The latch-pin is carried by the adjacent end of a rocker-arm 48$^b$ that is fulcrumed intermediate its ends to the side of lever 47 and at its outer end engaged by a coiled expansion spring 48$^c$ seated in a recess in lever 47. The end of the rocker-arm 47$^b$ is hook shaped as seen at 48$^d$ in Fig. 2, to permit its actuation by a substantially forward thrust of the operator's thumb, and the rocker is further provided with an L-shaped extension 48$^e$ adjacent the hooked end that extends horizontally across lever 47 so that it may be engaged laterally by the operator's thumb to depress the same and thereby remove latch pin 48 from recess 48$^a$. Extending from a central bore 30$^a$ of the nozzle is a pipe 30$^b$ which extends into a bore 30$^c$ is a ball-joint which latter is held to the end of extension 16 by an interiorly threaded collar 30$^d$.

When it is desired to use the apparatus as a cutting torch the oxygen or other oxidizing element is admitted through the operation of lever 47 to the central orifice 33 of nozzle 31 which supplies to the metal preheated by the flame from orifice 32 an abundance of the oxidizing elements which effectuates the quick oxidization and disintegration of the material operated upon.

As will be evident from the foregoing description all of the mechanism for supplying a superabundance of the oxidizing element to the flame may be omitted when a welding torch alone is desired and any shape or form of nozzle structure may be employed without in any way altering the principles of operation of my invention as herein disclosed.

I have herein illustrated a specific manner of practically carrying out the principles of my invention, which of course is susceptible of modification or refinement, and I, therefore, desire it understood that I do not limit myself to the exact structure herein disclosed.

What I claim as new is:—

1. In a torch for producing a flame from the mixture of a fuel element and an oxidizing element, means for utilizing an increase in the pressure in the discharge conduit to vary the ratio of the combustible element to extinguish combustion and comprising a body portion provided with a bore and passages leading, respectively, to the inner and end sides of said body, a conically headed plug axially bored and seated within said first mentioned body establishing connection between its axial channel and the bottom of said first mentioned bore, a conically recessed plug mounted within said first mentioned bore providing an annular converging passageway from the side passageways; said last mentioned plug being axially bored to aline with the bore in said first plug and being further provided with transverse channels leading from said side passageways to said central bore.

2. In a torch for producing a flame from the mixture of a fuel element and an oxidizing element, means for utilizing an increase in the pressure in the discharge conduit to vary the ratio of the combustible elements to extinguish combustion; said means including a body provided with a bore, a rod positioned in said bore and a portion whereof is reduced in diameter to provide an annular chamber, said rod having a central bore the inner end whereof is enlarged, a recessed plug seated in the inner portion of the enlarged bore of said rod and provided with lateral passageways connecting said bore with said annular chamber, and a bored plug fitting the outer end of the enlarged bore of said rod and provided with a projection coacting with said recess in the first mentioned plug; said recess and projection spaced apart to provide a converging passageway leading to the central bore of the first mentioned plug and said rod provided with outlet passageways leading from the annular chamber to said converging passageway between the adjacent ends of said plug sections.

3. A torch comprising a body having a passageway, a nozzle, means connecting the body and nozzle having a conduit establishing communication between said passageway and nozzle, and means controlling the flow of fuel through said passageway consisting of a chamber interposed therein having spaced inlet and outlet portions, a perforated piston movable between said ports, means carried by said piston for closing said outlet port, a spring adapted to hold said piston to normally close said outlet port, and means for moving said piston to uncover said outlet port.

4. A torch comprising a body having a passageway, a nozzle, means connecting the body and nozzle having a conduit establishing communication between said passageway and nozzle, and means controlling the flow of fuel through said passageway, a yielding normally seated control valve in said passageway, a tappet adapted to unseat said valve, a latch arm for actuating said tappet, and a latch adapted to secure said lever arm in fully opened and fully closed positions.

5. A torch comprising a body having a passageway, a nozzle, means connecting the body and nozzle having a conduit establishing communication between said passageway and nozzle, and means controlling the flow of fuel through said passageway, a chamber having an outlet port at one end, a piston fitting said chamber and perforated to permit the passage of pressure fluid to both sides thereof, a conical projection on said piston normally seated in the outlet port of said chamber, a spring for maintaining said piston normally in position when said projection is seated in said port whereby the pressure of the fluid upon said valve is reduced, and means for seating said projections from said outlet port.

6. In a torch a body portion having a passageway therethrough, a valve controlling said passageway, a lever arm fulcrumed at one end of said body for actuating said valve, a latching pin for securing said arm in desired positions, an arm fulcrumed intermediate its ends on said lever arm, one end whereof engages said pin, and a spring interposed between said arms adapted to hold said pin normally in latched position.

Signed at Chicago, County of Cook and State of Illinois, this 15th day of September, 1919.

JOHN GRAY PETTIS.

Witnesses:
E. K. LUNDY, Jr.,
FLORENCE MITCHELL.